United States Patent [19]
Patterson

[11] Patent Number: 5,801,782
[45] Date of Patent: Sep. 1, 1998

[54] ANALOG VIDEO ENCODER WITH METERED CLOSED CAPTION DATA ON DIGITAL VIDEO INPUT INTERFACE

[75] Inventor: James T. Patterson, San Jose, Calif.

[73] Assignee: Samsung Information Systems America, San Jose, Calif.

[21] Appl. No.: 619,381

[22] Filed: Mar. 21, 1996

[51] Int. Cl.$^6$ .............. H04N 7/00; H04N 11/00
[52] U.S. Cl. .............. 348/473; 348/468; 348/423
[58] Field of Search .............. 348/473, 474, 348/468, 423; 345/116, 202; 370/265, 542, 916; H04N 7/00, 11/00

[56] References Cited

U.S. PATENT DOCUMENTS

| | | |
|---|---|---|
| 5,157,489 | 10/1992 | Lowe . |
| 5,315,386 | 5/1994 | Muramoto . |
| 5,400,401 | 3/1995 | Wasilewski et al. . |
| 5,428,400 | 6/1995 | Landis et al. . |
| 5,438,370 | 8/1995 | Primiano et al. . |
| 5,493,339 | 2/1996 | Birch et al. .............. 348/468 |
| 5,512,954 | 4/1996 | Shintani . |
| 5,543,851 | 8/1996 | Chang . |
| 5,566,089 | 10/1996 | Hoogenboom . |
| 5,574,505 | 11/1996 | Lyons et al. . |
| 5,600,378 | 2/1997 | Wasilewski .............. 348/473 |
| 5,651,010 | 7/1997 | Kostreski et al. .............. 348/423 |

FOREIGN PATENT DOCUMENTS

| | | |
|---|---|---|
| 0 696 874 A2 | 7/1995 | European Pat. Off. . |
| 0 740 474 A2 | 4/1996 | European Pat. Off. . |
| WO 95/06391 | 8/1993 | WIPO . |
| WO 95/15660 | 12/1994 | WIPO . |

OTHER PUBLICATIONS

ISO/IEC 13818–2:1995, Information Technology—Generic coding of moving pictures and associated audio information: Video, pp. 28, 30, 42, 45, 46.

Philips SAA 7184, Digital Video Encoder (DENC2–M6), Aug. 17, 1995, version 1.1.

*Primary Examiner*—Mark R. Powell
*Assistant Examiner*—Vivek Srivastava
*Attorney, Agent, or Firm*—Lowe Hauptman Gopstein Gilman & Berner

[57] ABSTRACT

An arrangement and method for decoding an input transport signal, such as an MPEG transport signal, and inserting closed caption data presents an analog video encoder with decompressed video data and closed caption data at a single interface. This avoids polling by a microprocessor and the hardware and software expense.

39 Claims, 11 Drawing Sheets

ANALOG VIDEO ENCODER WITH METERED CLOSED CAPTION DATA ON DIGITAL VIDEO INPUT INTERFACE

BACKGROUND OF THE INVENTION

1. Field of the Invention

The present invention relates to the field of video data processing, and more particularly, to an apparatus and a method for performing analog video encoding of digital video data with closed caption data.

2. Description of Related Art

Federal Regulations require that televisions of a specified size have closed captioning capability. Broadcasters encode closed captioning data in portions of the video that are broadcast. Televisions decode the closed captioning data and display it on the screen with the video information. Closed captioning data assists the hearing impaired and people who do not have English as their native language to enjoy television. Closed caption encoding has been performed in the analog domain since television broadcasts have also been in the analog domain.

Relatively recent advances in technology have provided a digital means of transmitting video and audio data using image compression. As an example, the MPEG standard (Motion Pictures Experts Group) is a multimedia video playback standard that allows digital video to be compressed using a combination of image compression and a sophisticated form of differencing. A video sequence is encoded by recording differences between frames rather than entire images of each frame. The MPEG-2 standard supports high-quality digital video.

The MPEG standard was developed independently of television and did not originally consider closed captioning. As the desirability of delivering information in digital form to televisions has increased, features have been added to the MPEG standard in order to make it compatible with the requirements of television. These include the feature of providing closed captioning in the display of the data provided in the MPEG data stream. The recommended procedure for encoding closed captioning in the MPEG video stream is to provide the closed captioning data within the "user data" in the MPEG data stream. A block diagram of a prior art system for converting the input MPEG stream to an analog signal usable by a television is shown in the block diagram of FIG. 1.

The MPEG transport stream is provided to an MPEG transport demultiplexer (demux) 10. The MPEG transport stream is separated into an audio signal, a compressed video signal, and a user data signal. The audio signal is decoded by an MPEG audio decoder 12 and converted by a digital to analog converter 14 into a stereo analog signal. The compressed video signal is received by a video decoder 16 that decompresses the video signal according to a specified standard, such as CCIR-601 or CCIR-656. The decompressed video signal is converted to an analog signal by an analog video encoder 18, which provides a horizontal sync signal and a field signal to the video decoder 16. The analog signals generated by the analog video encoder 18 are the CVBS signal, the Y signal, and the C signal. The audio and the video signals are provided to a television set (not depicted in FIG. 1) through an RF modulator 20.

The user data is separated from the compressed video data and provided to the analog video encoder via a separate interface, as depicted in FIG. 1. The user data is read by a microprocessor 22 which first checks the analog video encoder 18 to determine whether the original analog video encoder 18 is able to accept the closed caption data at that time.

FIG. 2 is a more detailed depiction of portions of the prior art arrangement of FIG. 1. The transport demultiplexer 10 is depicted with multiplexers 24 and 26. The transport demultiplexer 10 generates an interrupt when it receives the user data. The microprocessor receives that interrupt, retrieves the user data from a buffer 28 and temporarily stores it. The microprocessor 22 monitors the status of the analog video encoder 18 through a status register 30. The contents of the status register 30 provide an indication to the microprocessor 22 whether the analog video encoder 18 is able to receive closed captioned data. When the status register 30 indicates that the analog video encoder 18 is ready to receive closed captioned data, the microprocessor 22 forwards the user data originally stored in buffer 28 to the closed captioned data register 32 and the analog video encoder 18. Closed captioned data is normally sent when the vertical retrace signal is sent out by the analog video encoder 18.

The use of a microprocessor in the prior art, as depicted in FIGS. 1 and 2, has the disadvantage of requiring extra hardware (the microprocessor) and an extra layer of software to run the microprocessor in order to perform the function of inserting closed captioned data in the video stream. This extra layer of hardware and software to insert the closed captioned data within an analog video stream complicates the flow of data and adds expense to the device.

SUMMARY OF THE INVENTION

There is a need for an analog video decoder and method for inserting closed captioned data contained within a digital video stream, such as an MPEG transport stream, into an analog output stream without the use of a microprocessor or its associated software.

This and other needs are met by the present invention which provides an arrangement for decoding an input transport signal, comprising a transport demultiplexer that receives an input transport stream and demultiplexes the input transport stream into an audio stream and a video stream containing compressed video and user data. The arrangement also includes a video decoder that receives the video stream and generates decompressed video and closed captioned data from the video stream. An analog video encoder is provided that receives the decompressed video and closed captioned data and generates an analog video output signal with encoded closed captioned data. The analog video encoder has a signal interface for receiving a decompressed video and closed captioned data.

The arrangement of the present invention avoids the use of a microprocessor to poll the analog video encoder, as well as the software needed to operate the microprocessor, by providing an analog video encoder that has a single interface that receives both the decompressed video and the closed captioned data.

In another aspect of the present invention, an analog video encoder for converting a digital video stream to analog video signals is provided. The analog video encoder comprises a single interface for receiving a digital video stream that includes video data and closed captioned data. At least one video data processor is provided for converting the video data into analog video signals. A data decoder identifies the closed captioned data in the digital video stream, and a closed captioning encoder receives the closed captioned data and inserts the enclosed captioned data into the analog video signals.

In a still further aspect of the present invention, a method of inserting closed captioned data in a video signal is provided. The method comprises the steps of receiving digital video data and closed captioned data at a single data interface of an analog video encoder. The digital video data and closed captioned data are converted into video analog signals with inserted closed captioning using the analog video encoder.

The foregoing and other features, aspects and advantages of the present invention will become more apparent from the following detailed description of the present invention when taken in conjunction with the accompanying drawings.

DETAILED DESCRIPTION OF THE ILLUSTRATIVE EMBODIMENTS

Figure 3:
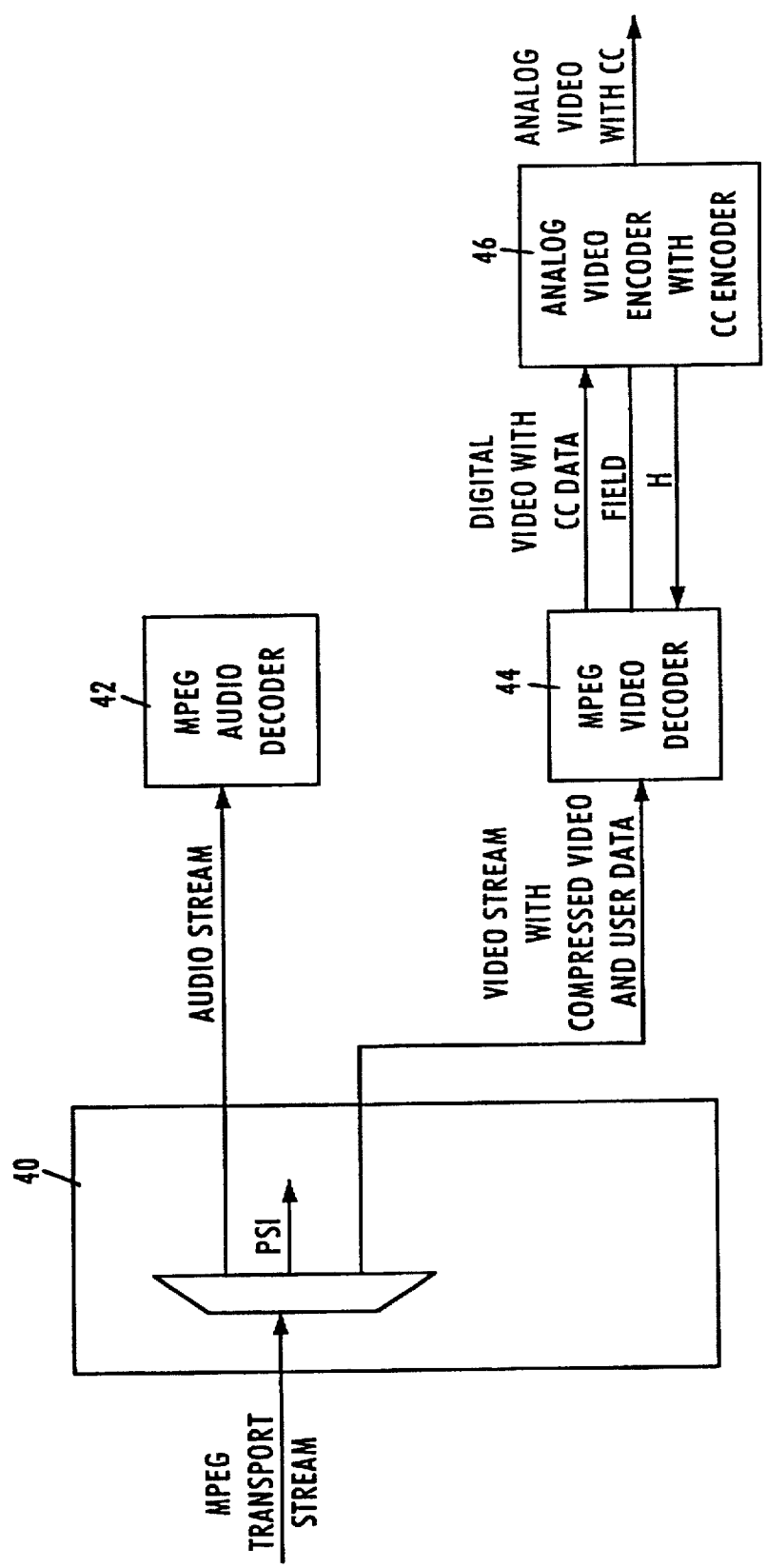
FIG. 3 is a block diagram of an arrangement for converting a transport stream into analog signals constructed in accordance with an embodiment of the present invention.

FIG. 3 is a block diagram of a conversion arrangement for converting a transport stream, such as an MPEG transport stream, into analog signals suitable for use by a conventional television set.

The arrangement includes a transport demultiplexer 40 which demultiplexes the transport stream, such as an MPEG transport stream, into an audio stream and a video stream. The MPEG transport stream also includes a PSI stream.

The demultiplexed audio stream is provided to an MPEG audio decoder 42, which converts the digital audio stream into an analog audio signal. The video stream, which comprises compressed video and user data, is sent to an MPEG video decoder 44. The video stream is decoded by the MPEG video decoder 44 into a decompressed digital video stream with closed captioned data. Exemplary embodiments of a video decoder usable in the arrangement of FIG. 3 is described in more detail later and are depicted in FIGS. 8–11. The decompressed video and closed captioned data is received at a single input port interface at an analog video encoder 46 that includes a closed caption encoder. The analog video encoder 46 converts the digital video signal and inserts the closed is captioned data sent with the digital video signal and received at the single interface of the analog video encoder 46 into analog signals usable by a conventional television receiver.

The arrangement of FIG. 3 avoids the use of a microprocessor which polls a status register in the analog video encoder 46 and supplies closed caption data from the video decoder 44 to a separate interface of the analog video encoder 46. The elimination of a microprocessor and a separate interface for the closed captioned data at the analog video encoder reduces the cost of the arrangement (due to the decrease in hardware). The complexity of the arrangement is also reduced since the software to operate the microprocessor to poll the analog video encoder to properly time the sending of the closed captioned data to the analog video encoder is eliminated.

Figure 4:
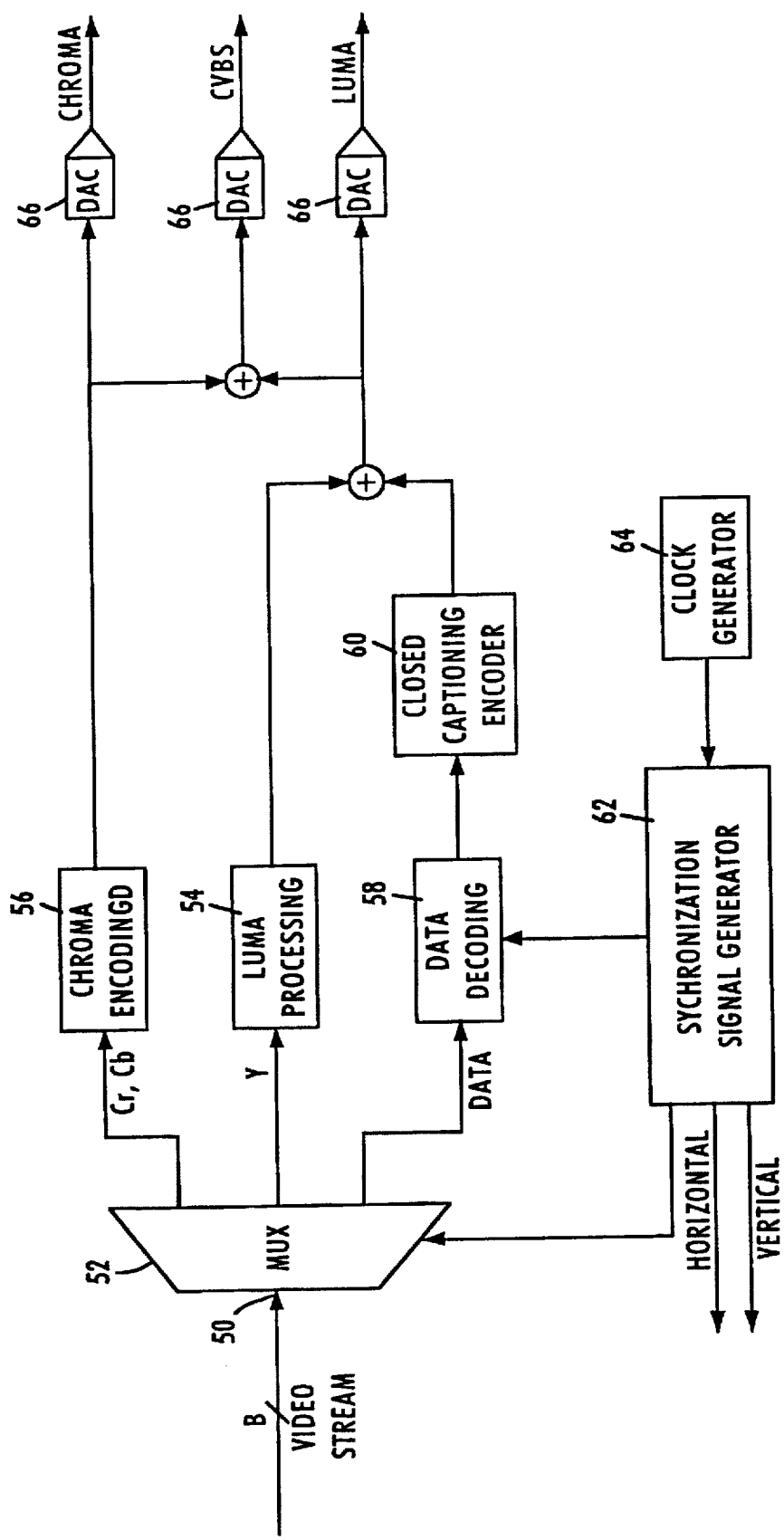
FIG. 4 is an analog video encoder constructed in accordance with an embodiment of the present invention.

An embodiment of the analog video encoder 46 depicted in FIG. 3 is provided in the block diagram of FIG. 4. The analog video encoder of FIG. 4 is suitable for converting a decompressed video signal that conforms to the CCIR-601 standard. Currently the CCIR-601 mode is the most popular in MPEG systems because the analog video encoder is used as the display synchronization master. This means that the analog video encoder generates the horizontal and field signals for the MPEG video decoder 44 of FIG. 3.

The video data stream received at the single video input interface 50 of the analog video encoder 46 is an 8-bit video stream, for example. The video data stream is in CCIR-601 mode with closed caption data added. The CCIR-601 video data is multiplexed luma (Y) and chroma (Cr, Cb). It is in the sampling format referred to as 4:2:2, which means that the active video signal of each line of video appears in the following order: Cb, Y, Cr, Y, Cb, Y, Cr, Y, . . . During the active video time, the multiplexer 52 of the analog video encoder 46 sends the multiplexed luma samples through a luma processor 54. Also during this active video time, the multiplexer 52 provides the chroma (Cr, Cb) to a chroma encoder 56. The multiplexer 52 sends the video data stream to a data decoder 58 during the non-active video time.

The luma processor 54 receives the luma signal arriving at 13.5 MHz rate and interpolates the signal to 27 MHz. This eases design requirements of analog anti-imaging filters on digital to analog convertor outputs. In addition, any luma filtering such as bandwidth reduction or chroma notch filtering, is performed at the luma processor 54.

The chroma encoder 56 receives the Cr and Cb data and scales this data properly for chroma encoding. The chroma encoder 56 also generates and asserts color bursts into the output signal. The chroma bandwidth is also reducible using the chroma encoder 56.

The data decoder 58 examines the video data stream sent to it by the multiplexer 52 for a sequence of bytes that indicates the presence of closed captioned data. Depending on the protocol established between the MPEG video decoder 44 and the analog video encoder 46, the sequence of bytes occurs at a certain time during a non-active video time.

As an example, assume that the sequence is 0, 255, LN, CC_1, CC_2, Chk_sum1, and Chk_sum2. In this sequence, 0, 255 is the start sequence. LN is the line number where the closed captioned data is to be encoded. CC_1 is the first byte of closed captioned data. CC_2 is the second byte of closed captioned data. Chk_sum1 is the seven most significant bits of the check sum and Chk_sum2 is the seven least significant bits of the check sum. The upper bit of Chk_sum1 and Chk_sum2 are set to 0 to prevent false start sequence emulation. The start sequence is unique since, according to the EIA608 recommendation, all of the closed captioned data types are ASCII. They are also limited to a range from 16 to 127.

Figure 6:
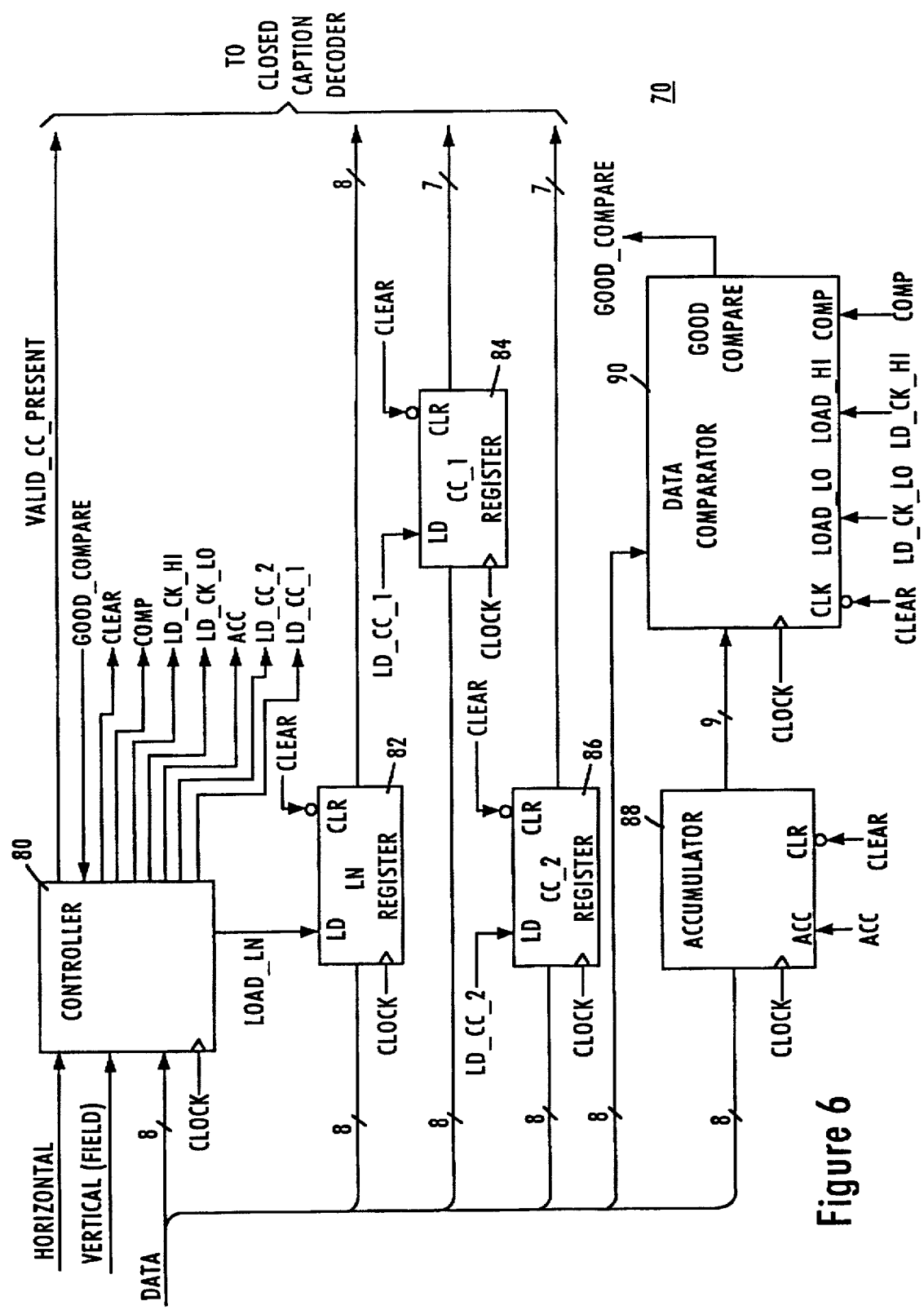
FIG. 6 is a block diagram of a data decoder constructed in accordance with an embodiment of the present invention for use in the analog video encoder of FIG. 4.

FIG. 6 is a block diagram of a data decoder constructed in accordance with an embodiment of the present invention that may be used in the embodiment of the analog video encoder of FIG. 4. A controller 80 receives the data stream (CCIR-601 data), the horizontal timing reference signal and the vertical (field signal) timing reference. When the controller 80 recognizes a transition on the field signal, it clears an LN register 82, a CC_1 register 84, a CC_2 register 86, an accumulator 88, and a data comparator 90 by setting the clear signal low for one clock cycle. The controller 80 also sets the following output signals low: Valid_CC_present, COMP, LD_CK_HI, LD_CK_LO, ACC, LD_CC_1, and LD_CC_2.

At the next falling edge of the horizontal signal after the transition of the field signal the controller 50 starts looking for the start sequence. After the controller 80 receives the start sequence of 0, 255, it enables the LN register 82 by setting LOAD_LN high.

On the next clock, the controller 80 enables loading of the CC_1 register 54 by setting LD_CC_1 high. The controller 80 also enables the accumulator 88 by setting ACC high. The LN register 82 is disabled by the controller 80 setting LOAD_LN low.

On the next clock, the controller 80 enables loading of the CC_2 register 86 by setting LD_CC_2 high and disables CC_1 register loading by setting LD_CC_1 low. On the next clock, the controller 80 disables the accumulator 88 by setting ACC low. The CC_2 register loading is disabled by the controller 80 setting LD_CC_2 low. The controller 80 also instructs the data comparator 90 to load the first byte of the check sum (Chk_sum1) by setting LD_CK_LO high. On the next clock, the controller 80 instructs the data comparator 90 to load the second byte of the check sum (Chk_sum2) by setting LD_CK_HI high and setting LD_CK_LO low.

On the next clock, the controller 80 instructs the data comparator 90 to compare the check sum (formed with Chk_sum1 and Chk_sum2) with the nine-bit value from the accumulator 88. This is accomplished by the controller 80 setting LD_CK_HI signal low and setting the COMP signal high. If the values compare "OK", the data comparator 90 sets the GOOD_COMPARE signal high. If the values do not compare "OK", then the data comparator 90 maintains the GOOD_COMPARE signal low.

In response to the GOOD_COMPARE signal being high, the controller 80 on the next clock sets the Valid_CC_present signal high. If the GOOD_COMPARE signal is low, then the controller 80 leaves the Valid_CC_present signal low and clears the LN register 82, the CC_1 register 84, the CC_2 register 86, the accumulator 88 and the data comparator 90 by setting the CLEAR signal low for one clock cycle. The controller 80 then returns to examining for a field signal transition to begin the process again.

The protocol may be a three step process. For example, the analog video encoder 46 may make a transition on the field signal. When the analog video encoder 46 generates the next falling edge of the horizontal signal, the analog video encoder 46 expects to receive the sequence of bytes described above at its digital video input interface 50. If the above sequence of bytes is not seen, then the data decoder 58 does not encode data in the next line 21.

Figure 1:
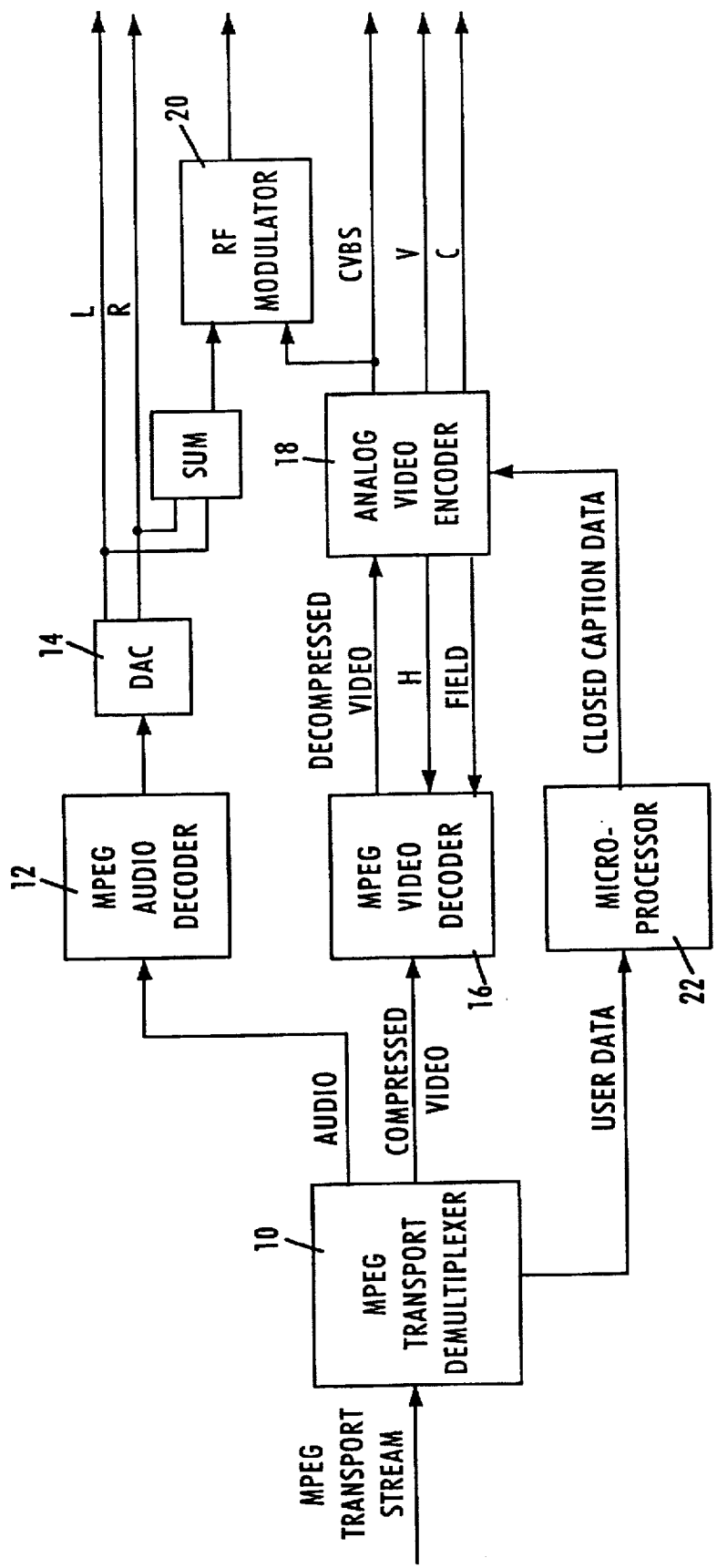
FIG. 1 is a block diagram of an arrangement according to the prior art for converting an MPEG transport stream into analog signals for use by a television.
Figure 2:
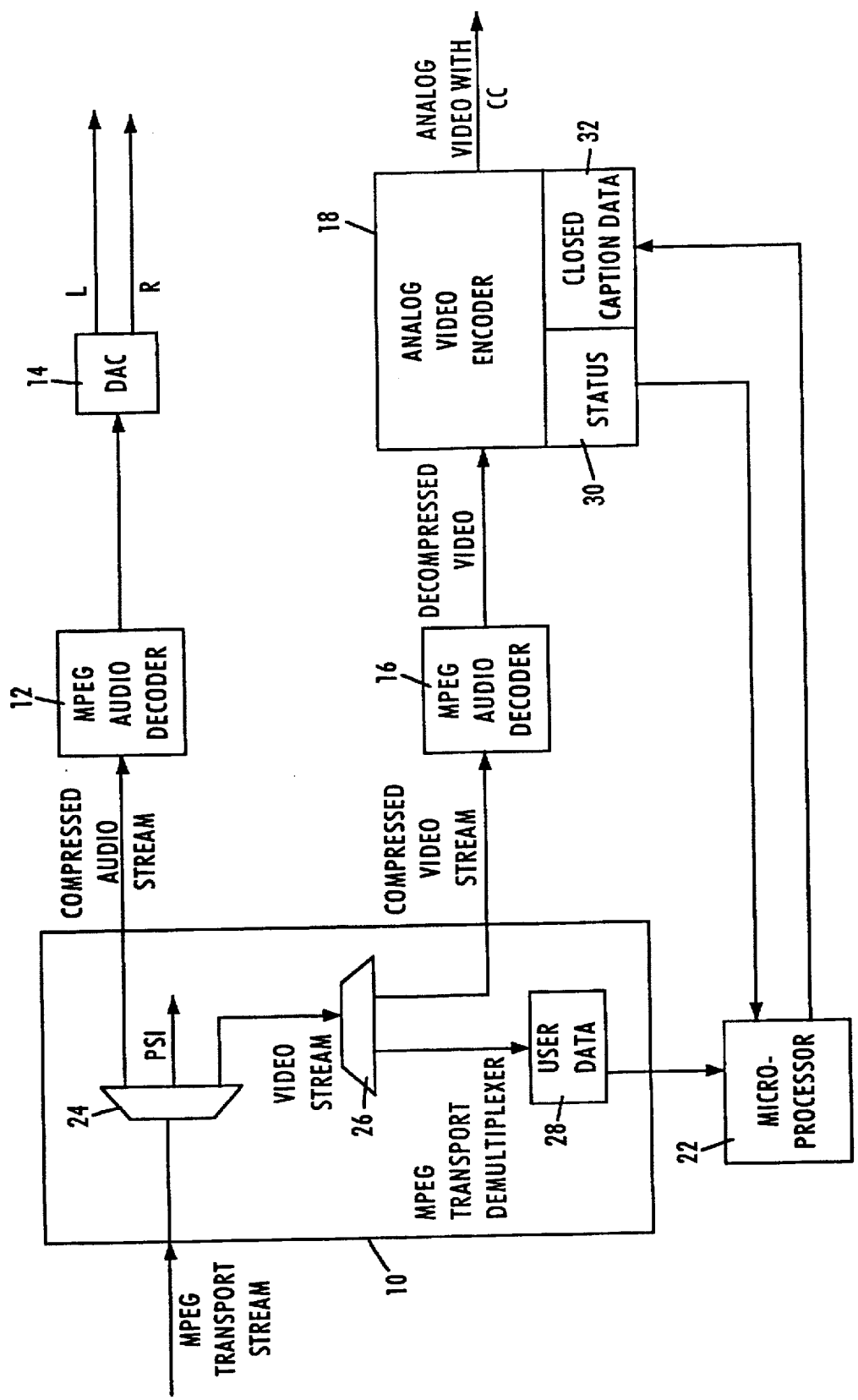
FIG. 2 is a block diagram depicting in more detail elements of the prior art arrangement of FIG. 1.

Referring to FIG. 4, a closed captioned encoder 60 is coupled to the output of the data decoder 58. When enabled, the closed captioned encoder 60 automatically generates seven cycles of clock running (32×line rate) start bit insertion (001) and finally insertion of the two data bytes per line. Data bits are encoded so that logic low at the video outputs corresponds to zero IRE and logic high corresponds to 50 IRE. This conforms to FIG. 1, section 2.2 of standard EIA-608. The EIA-608 is the recommended practice for line 21 data service.

The analog video encoder 46 includes a synchronization signal generator 62 that receives a 27 MHz clock signal from clock generator 64 and generates all of the horizontal and vertical timing references. Included in the horizontal references are the "start of active video," "end of active video," and "burst gate flag". The synchronization signal generator 62 provides the external horizontal and field signals to the MPEG video decoder 44. The select signals for the multiplexer 52 are also provided by the synchronization signal generator 62.

The clock generator 64 generates a clock signal that is 32 times the line rate clock for the closed captioned encoder. This clock signal is locked to the horizontal timing reference.

The outputs of the chroma encoder 56, luma processor 54, and the closed captioned encoder 60 are provided as inputs to digital to analog converters (DAC's) 66. These digital to analog converters convert the digital signals to analog chroma, CVBS, and luma signals suitable for use by a conventional television apparatus.

In operation of the analog video encoder 46 of FIG. 4, the synchronization signal generator 62 will send a synchronization signal, either the horizontal or field signal, to the video decoder 44 (depicted in FIG. 3). In response, the video decoder 44 will order two bytes of closed captioned data within a predetermined time (i.e., a certain number of data bytes) after the synchronization signal has been sent by the synchronization signal generator 62. The synchronization signal generator 62 will, at the appropriate time after sending its synchronization signal to the video decoder 44, control the multiplexer 52 to provide the video data to the data decoder 58. The synchronization signal generator 62 will also control the data decoder 58 at this time. The data decoder 58 will search for the sequence of bytes that indicates closed captioned data is present. If the data decoder 58 determines that the closed captioned data is present, it provides this data to the closed captioning encoder 60, which automatically generates the appropriate cycles of clock running, start bit insertion and insertion of the two data bytes per line. The signal output by the closed captioned encoder 60 is combined with the signal from the luma processor 54, and the chroma encoder 56.

According to certain embodiments of the present invention, the closed captioned data is sent to the analog video encoder following a specific preamble of data bytes during a blanking interval. In other embodiments, the closed captioned data is sent to the analog video encoder by the video decoder 44 during a vertical synchronization period.

Figure 5:
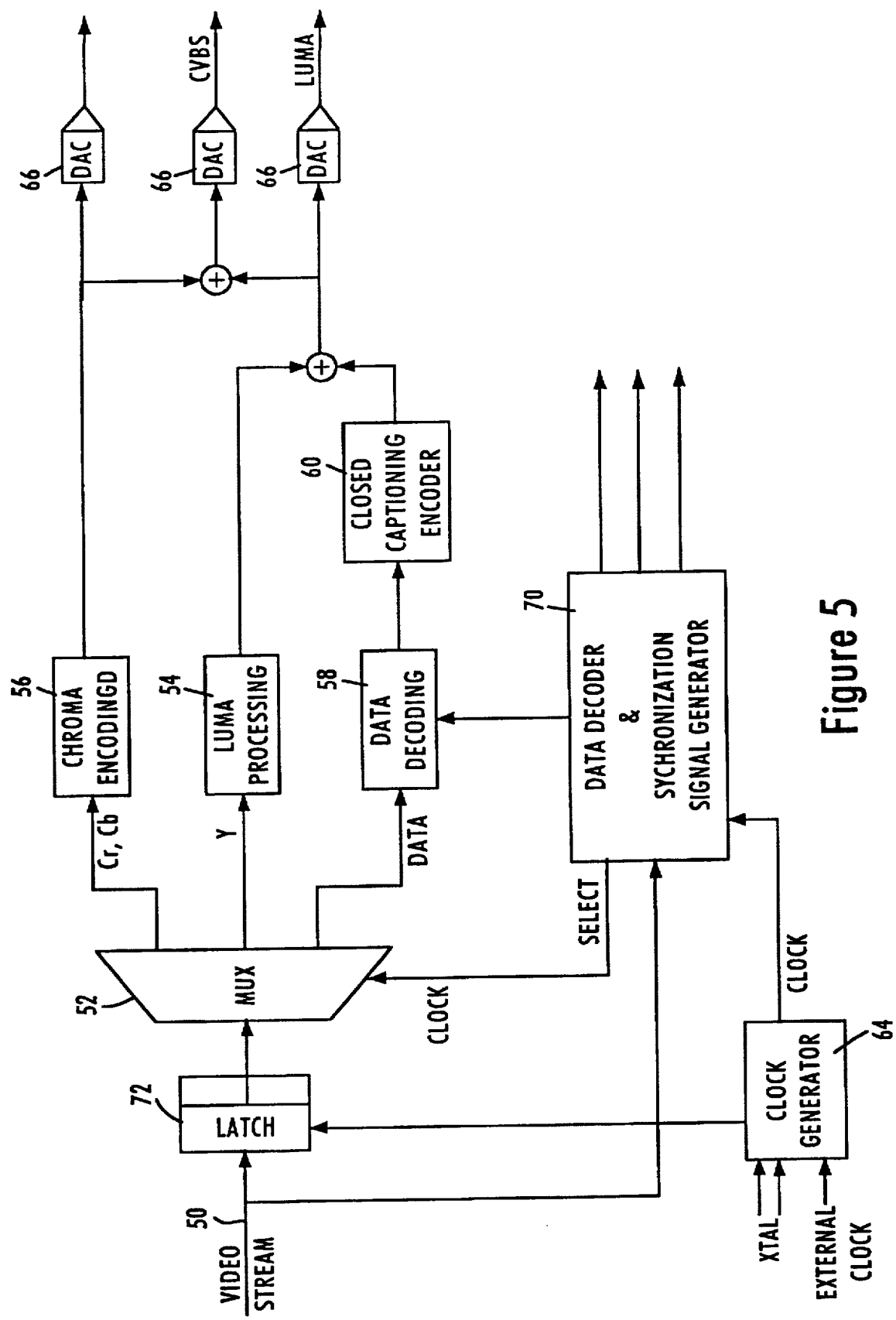
FIG. 5 is a block diagram of an analog video encoder constructed in accordance with another embodiment of the present invention.

FIG. 5 is a block diagram of another embodiment of the analog video encoder 46, this embodiment being suitable for converting data that is in CCIR-656 mode. A CCIR-656 data is a super set of CCIR-601. The data includes horizontal timing information, vertical timing information and ancillary data. Since the video signal itself contains the horizontal timing information and vertical timing information (as well as the ancillary data), the analog video encoder 46 does not act as the display synchronization master. Instead, the data decoder and synchronization signal generator 70 in the embodiment of FIG. 5 receives the video stream directly at the single video interface 50. The synchronization signal generator 70 also has a data decoder which examines the video stream to determine whether the ancillary data contains closed captioning data. If so, the data decoder and synchronization signal generator 70 will cause the multiplexer 52 to send the ancillary data to the data decoder 58.

The chroma encoder 56, luma processor 54 and closed captioning encoder 60 operate in the same manner as in the embodiment of FIG. 4 and their description of operation will not be repeated.

A latch 72 is provided at the single input interface 50 and before the multiplexer 52 to latch the video stream as it is being input into the analog video encoder 46. This provides the data decoder and synchronization signal generator 70 with time to examine the video stream to determine the selection of the multiplexer and correctly route the data between the chroma encoder 56, luma processor 54 and data decoder 58.

In operation, the video stream contains the ancillary data that has closed captioned data within it. The ancillary data may include code data which indicates that closed captioned data follows the code data within the ancillary data. This is detected by the data decoder and synchronization signal generator 70 while the video stream is latched in latch 72. When the data decoder and synchronization signal generator 70 identifies a 0, 255, and timing information byte sequence in the data stream to the analog video encoder 46, the generator 70 becomes aware that it is receiving ancillary data. The generator then waits for a byte sequence that indicates that the ancillary data has closed caption data embedded. Once the generator 70 identifies that byte sequence, it informs the data decoding module 58 that closed captioned data is embedded by setting a CC_Embedded signal high. Data decoder and synchronization signal generator 70 causes the multiplexer 52 to route the video stream to the data decoder 58. In certain embodiments, the closed captioned data follows the code data by a predetermined amount of bytes. In other embodiments, the closed captioned data follows the code data by an amount of bytes (or lines) indicated by information in the code data. This allows the timing of the receipt of the closed captioned data to be variable.

Figure 7:
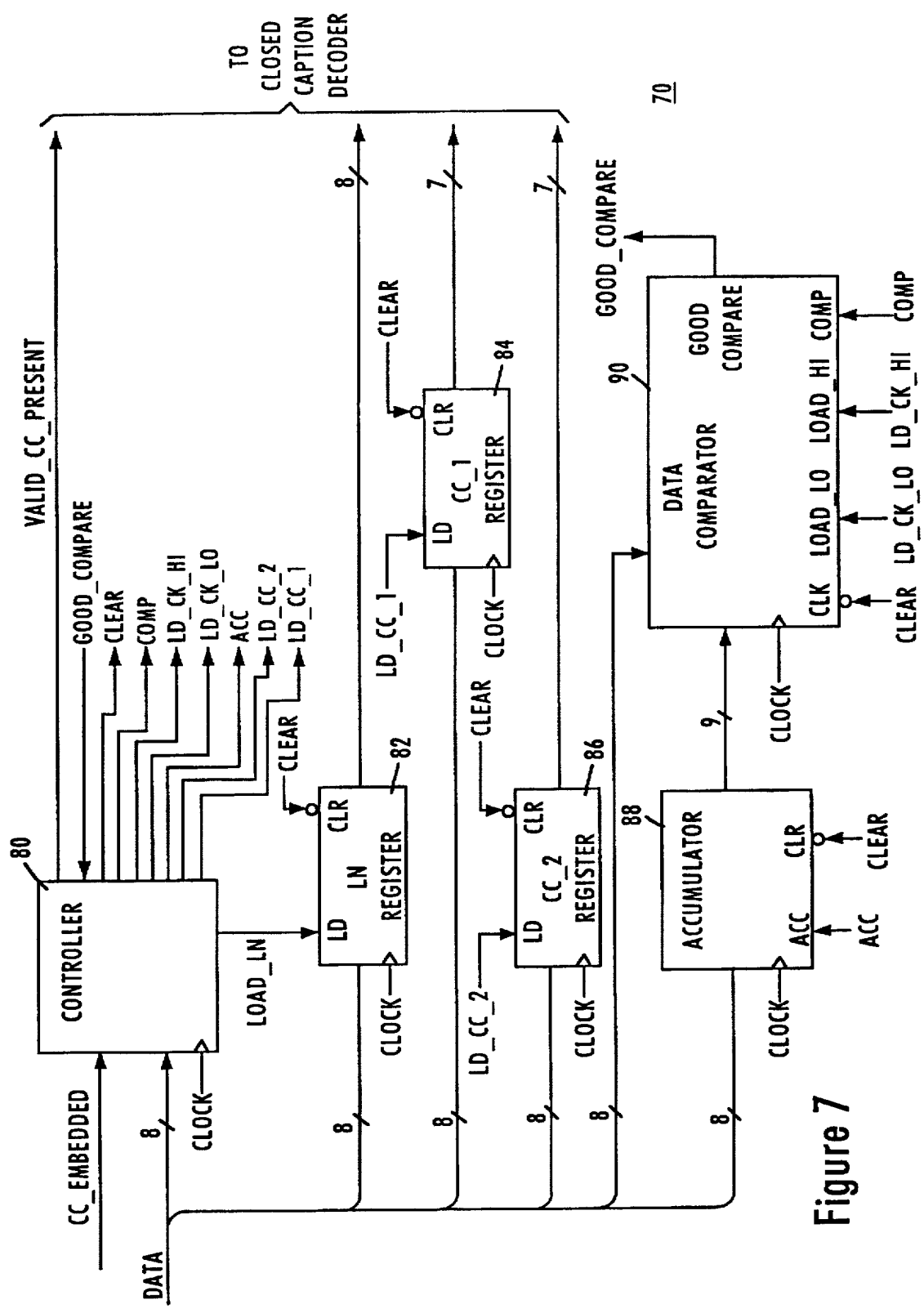
FIG. 7 is a block diagram of a data decoder constructed in accordance with an embodiment of the present invention for use in the analog video encoder of FIG. 5.

The data decoder of FIG. 7 is similar to that of FIG. 6, and therefore its components have the same reference numerals as used in FIG. 6. However, the controller 50 in the embodiment of the data decoder of FIG. 7 is responsive to the CC_Embedded signal asserted by the data decoder and synchronization signal generator 70, instead of the field signal transition. The detailed operation of the data decoder of FIG. 7 is otherwise the same as that of FIG. 6.

Figure 8:
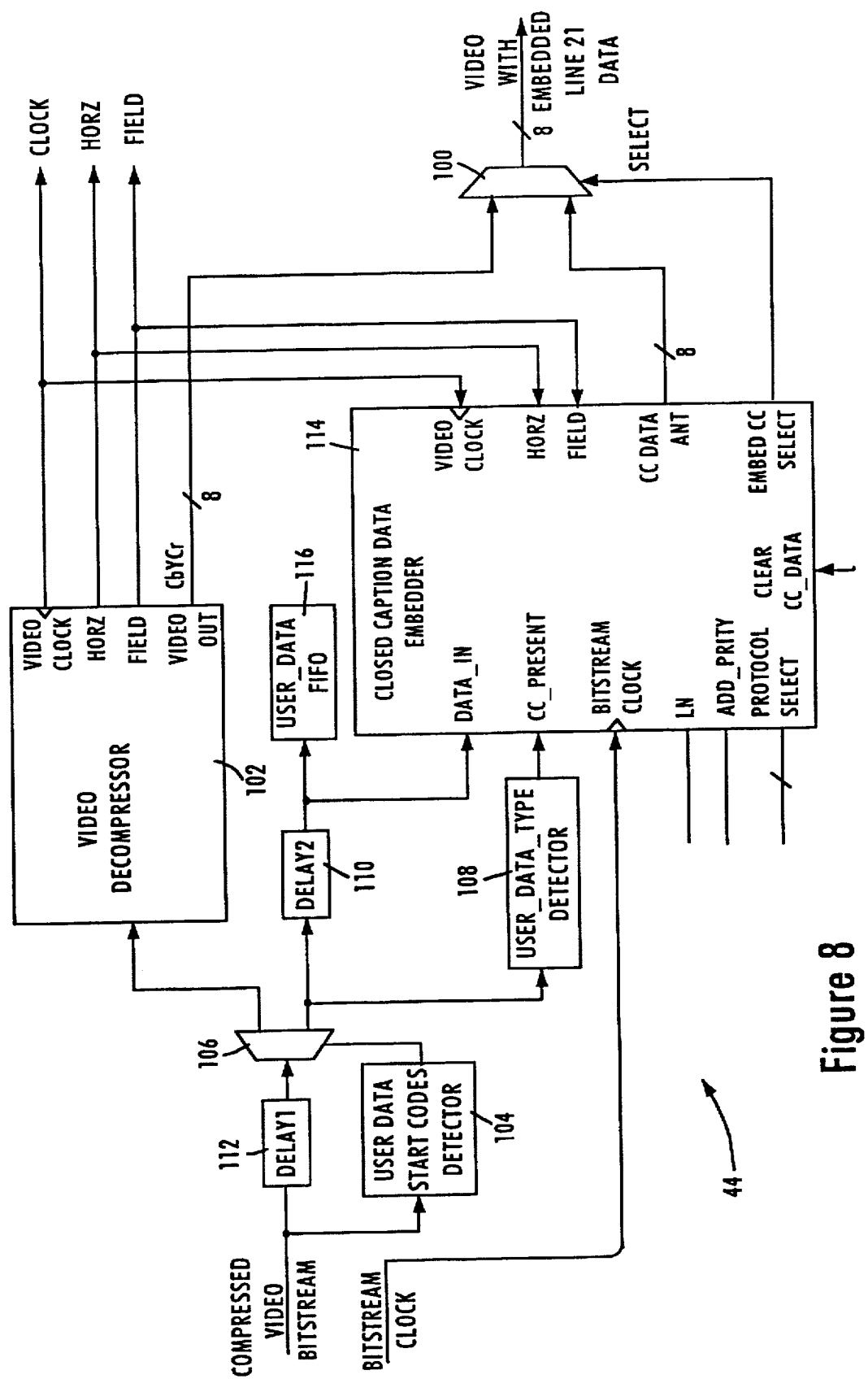
FIG. 8 is a block diagram of a video decoder with closed caption embedder constructed in accordance with an embodiment of the present invention and used in the arrangement of FIG. 3, when configured with an analog video encoder as depicted in FIGS. 4 and 6.

An exemplary embodiment of a video decoder 44 for use with the analog video encoder of FIG. 4 is depicted in FIG. 8. Accordingly, the decompressed digital video that is produced at the output of this embodiment of the video decoder is in the CCIR-601 mode. In this mode, the analog video encoder 46 is used as the display synchronization master, and the CCIR-601 mode bitstream is just digital video.

As an overview of its functionality, the video decoder 44 receives closed caption data (or other data for encoding in line 21 of the vertical blanking interval of analog video) embedded in the user data portion of the compressed video bitstream. If the video decoder 44 determines that the user data is closed caption data (or other data for line 21 encoding), then the video decoder 44 will send out the data at a rate of two bytes per field, on the same data interface used for the decompressed digital video output. For the embodiment of FIG. 10, in which the output digital video is CCIR-656 data, then the closed caption data may be encoded as ancillary data. If the output digital video is CCIR-601, then the closed caption data may be presented at a certain time (such as during the vertical sync) or after a certain preamble of bytes during a blanking interval.

In the CCIR-601 mode, the video decoder 44 is not the display synchronization master. This means that the display horizontal and field synchronization signals are generated externally for the video decoder 44. As described earlier, in the CCIR-601 mode the video data is multiplexed luma (Y) and chroma (Cr, Cb). It is in the sampling format referred to as 4:2:2, which means that the active video signal of each line of video appears in the following order: Cb, Y, Cr, Y, Cb, Y, Cr, Y, . . . During the active video time, the second multiplexer 100 of the video decoder 44 of FIG. 8 sends the Cb, Y and Cr data from a video decompressor 102 to the outputs of the video decoder 44. During the non-active video time, the second multiplexer 100 is able to send the byte sequence that contains closed caption data to the video output of the video decoder 44.

A user data start code detector 104 scans the compressed video bitstream for user data start codes. User data may be in the sequence layer, the group of picture (GOP) layer, or the picture layer, as described in Motion Picture Experts Group Video, ISO/IEC 13818-2:1995, Information Technology—Generic coding of moving pictures and associated audio information: Video. When the user data start code detector 104 sees user data start sequences, the detector 104 controls a first multiplexer 106 to send the bitstream to a user data type detector 108 and a second delay 110. A first delay 112 compensate for the processing delay of the user data start code detector 104.

The user data type detector 108 examines the user data type field in the user data bitstream to determine if it is closed caption data (or data for line 21 encoding). The user data type field will be 08 (in hexadecimal format) if the user data is closed caption data. The field will be 09 (in hexadecimal) if it is data for line 21 encoding. If the user data is closed caption or data for line 21 encoding, then the user data type detector 108 informs a closed caption data embedder 114 that the data it is receiving should be processed by setting CC_present signal high. The second delay 110 compensates for the processing delay of the user data type detector 108.

The video decompressor 102 receives the compressed video bitstream and produces uncompressed digital video in a conventional manner. The digital video output of the video decompressor 102 has CCIR-601 levels, in which the luma values range from 16 to 235, the Cr and Cb value range from 16 to 240.

A user data FIFO (first-in, first-out buffer) 116 holds all of the user data that is received in the compressed video bitstream. The user data may contain other data that is not closed-caption data that the rest of the system may need.

Figure 9:
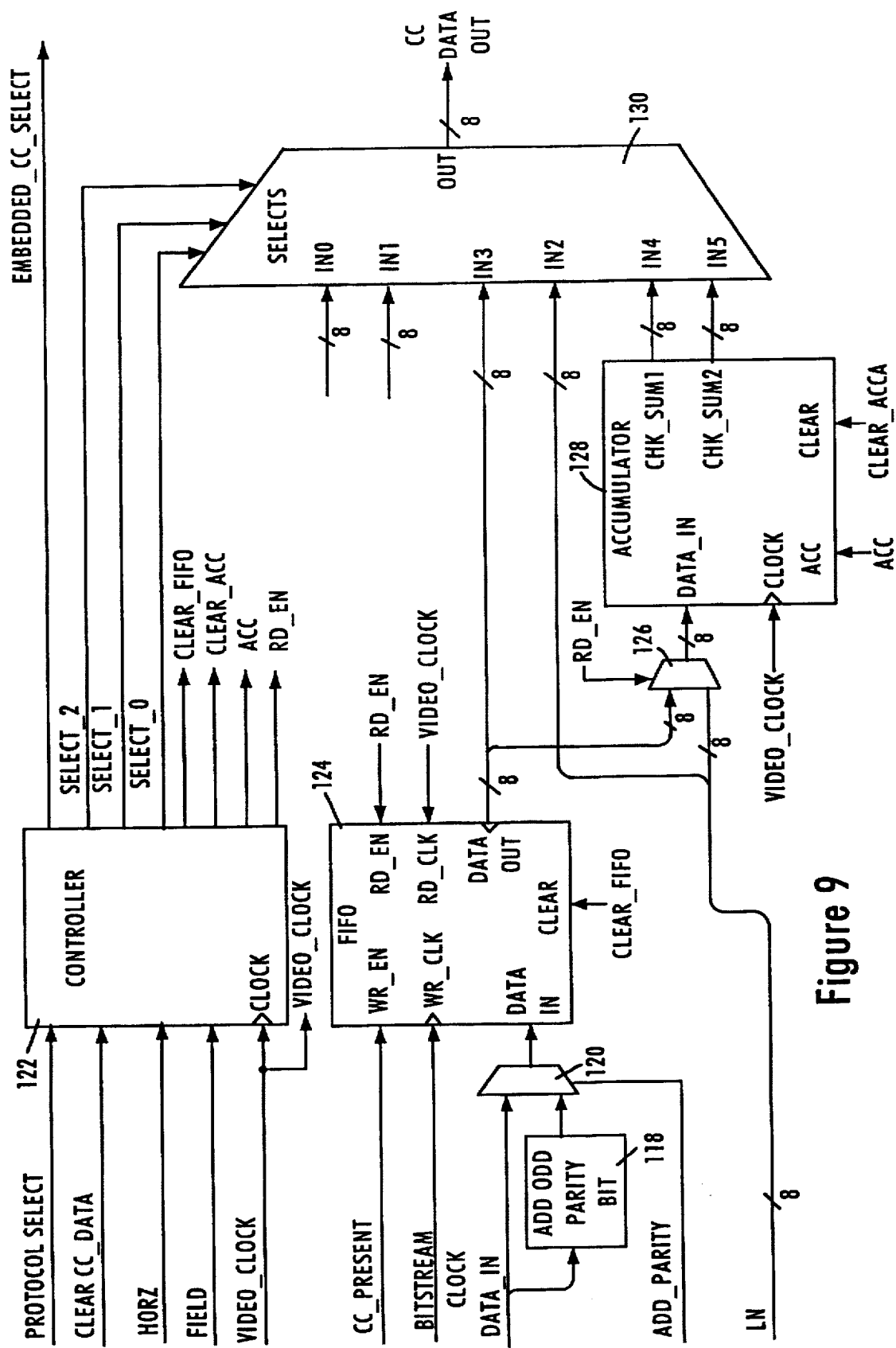
FIG. 9 is a block diagram of a closed caption data embedder constructed in accordance with an embodiment of the present invention and used in the video decoder of FIG. 8.

The closed caption data embedder 114 receives the closed caption user data and sends it out on the CC__data__out port. An embodiment of the data embedder 114 used for the CCIR-601 mode (where the video decoder 44 is slaved to the external video synchronization signals) is depicted in FIG. 9.

When the CC__Present signal is high, the embedder 114 knows that the bitstream data at the Data__in port is closed caption data or data for line 21 encoding. The embedder 114 uses the bitstream clock to clock in the data on the Data__in port.

The LN port is the line number during the vertical blanking interval of video where the closed caption data is to be encoded. In most applications, the line number will be 21.

The Add-parity port informs the embedder 114 to add an odd parity bit to the closed caption data before sending it out of the video decoder 44. The data for closed captioning or line 21 is 7 bits of data with one odd parity bit. It may not be desired to add the parity bit if data other than closed caption data or line 21 data is to be sent out of the video decoder 44 on the digital video outputs. Another instance where it is not desirable for the video decoder 44 to add the odd parity bit is when the analog video encoder 46 adds the odd parity bit itself when encoding the data.

The protocol select port informs the embedder 114 what type of protocol to use for placing the closed caption data on the digital video output ports. A very simple example of protocol may be to put only the two closed caption bytes out on the video output port on the first horizontal edge after a field transition. The closed caption data is always encoded on line 21 of the present field. This protocol may be adequate for the case when the video decoder 44 is directly connected to the analog video encoder 46.

An example of a flexible and more robust protocol involves generating a byte sequence that has a start sequence, line number, closed caption data and check sum values. The byte sequence may then be provided as an output at a certain time (determined by the protocol) during the vertical blanking interval. This exemplary protocol would be especially useful for embodiments in which the digital video out of the video decoder 44 passes through another module (such as a graphics overlay module) prior to the analog video encoder 46. The extra module between the video decoder 44 and the analog video encoder 46 at times may corrupt the data during the blanking interval. This may occur during graphics mode changes.

In a very robust and complicated protocol, the byte sequences are output with error correction more than once.

An example of the second protocol mentioned above will be described in more detail below. The embedder 114 produces a sequence of bytes that include closed caption data. Depending on the protocol established between the video decoder 44 and the analog video encoder 46, the sequence of bytes occurs at a certain time during the non-active video time. As an example, assume the sequence is: 0, 255, LN, CC__1, CC__2, Chk__sum1, Chk__sum2. The start sequence is represented by 0, 255. LN represents the line number where the closed caption data is to be encoded. CC__1 is the first byte of closed caption data. CC__2 is the second byte of closed caption data. Chk__sum1 and Chk__sum2 form the check sum of LN, CC__1 and CC__2. Chk__sum1 represents the 7 most significant bits of the check sum and Chk__sum2 the 7 least significant bits. The upper bit of Chk__sum1 and Chk__sum2 are each set to 0 to prevent false CCIR-656 start sequence emulation.

The start sequence is unique since, according to the EIA608 recommendation, all of the closed caption data types are ASCII. The data types are also limited to a range from 16 to 127.

The protocol may be a three-step process. The analog video encoder 46 makes a transition on the field signal. When the analog video encoder 46 generates the next falling edge of horizontal, it expects to receive the sequence of bytes shown above on its digital video input. If it does not see the above sequence of bytes with a valid check sum, then it assumes that there is no valid closed caption data available for encoding.

The Clear CC__data pin is brought low to clear the internal memory of the embedder 114. This is normally done whenever the user changes channels or program streams. The video clock is used to clock the eight-bit data out of the CC__data out port.

The CC__data out port is where the eight-bit data sequence that contains closed caption data exits the embedder 114. The closed caption data exits the port at the proper rate and at the proper time. In other words, there are only two closed caption bytes that are sent every odd field (and only two bytes sent for line 21 encoding per field). They occur at the right time, such as after the first horizontal edge after a field signal transition.

The Embed CC Select signal informs the second multiplexer 100 when the byte sequence containing closed caption data is exiting the embedder 114. When the data sequence is generated out of the embedder 114, the second multiplexer 130 sends the data sequence out on the digital video output port of the video decoder 44. At all other times, the Embed CC Select signal directs the second multiplexer 130 to send the digital video from the video decompressor out on the digital video output port of the video decoder 44.

The horizontal pin of the embedder 114 receives the horizontal synchronization signal. The field pin receives the field synchronization signal.

The second multiplexer 100 sends either the digital video from the video decompressor 102 or the byte sequence from the embedder 114 to the digital video output port of the video decoder 44. The selection is made through the select pin (the Embed CC Select signal from the embedder 114).

An embodiment of the embedder 114 to implement the exemplary second protocol is depicted in FIG. 9. This embodiment includes a controller 122, a FIFO 124, an accumulator 128 and a multiplexer 130.

The controller 122 uses the FIFO 124 to store incoming closed caption data and meter this data out two bytes per field. The bitstream will not be running at the same clock rate as the Video__clock and the closed caption data into the embedder 114 my be burst. The bitstream clock is connected to the WR__CLK (write clock) pin of the FIFO 124, and CC__present is connected to the WR__EN (write enable pin of the FIFO 124). Data is written into the FIFO 124 on every rising edge of the bitstream clock whenever the CC__present signal is brought high. Data is read from the FIFO 124 on every rising edge of Video__clock whenever RD__EN (read enable) is high.

The accumulator 128 generates a check sum by adding LN and the two closed caption bytes. This number is more than eight bits so it is put in Chk__sum1 and Chk__sum2.

If the add__parity signal is high, then incoming closed caption data has an odd parity bit added to it before it is written into the FIFO 124. The controller 122 sets the Embedded CC Select signal high when it is sending out the embedded closed caption byte sequence.

The initial state of the controller 122 has the RD__EN and the ACC signals in their inactive low state. The clear__ACC signal is in its active low state. The clear_FIFO signal is in its inactive high state. When it is supposed to send out the closed caption byte sequence, the controller 122 will perform the following sequence of actions.

On the first rising clock edge, a zero is sent out on the CC data out port by selecting the in0 port of the multiplexer 130. The clearing of the accumulator 128 is stopped by setting the clear_ACC signal high.

On the next rising clock edge, 255 is sent out on the CC data out port by selecting the in1 port of the multiplexer 130. The ACC signal is set high so that the accumulator 128 starts accumulating on the next rising clock edge. RD_EN is already low so that multiplexer 126 sends the LN byte to the accumulator 128.

On the next rising clock edge, the controller 122 sends LN out on CC data out port by causing the multiplexer 130 to select the in2 port. The RD_EN signal is set high. This allows the Video_clock read out the next closed caption data byte for multiplexers 126 and 130. Setting RD_EN high also causes multiplexer 126 to send the closed caption data from the FIFO 124 to the accumulator 128.

On the next rising clock edge, the controller 122 sends out the first closed caption byte from the FIFO 124 by causing the multiplexer 130 to select the in3 port. The reading of the closed caption data out of the FIFO 124 is stopped by setting RD_EN low. The accumulator 128 stops accumulating in response to the controller 122 setting the ACC signal low.

On the next rising clock edge, the first check sum byte (Chk_sum1) by causing the multiplexer 130 to select the in4 port. On the next rising clock edge, the controller 122 sends out the second check sum byte (Chk_sum2) by causing the multiplexer 130 to select the in5 port. This is the end of the closed caption data sequence, so that on the next rising clock edge, the controller 122 clears the accumulator 128 be setting the clear_ACC low. The controller 122 sends a 0 out on the CC data out port by selecting the in0 port of multiplexer 130.

When the clear_CC data is brought low, the controller 122 clears the contents of the FIFO 124 and the accumulator 128. The controller 122 returns to its initial state and waits for proper conditions (determined by the protocol select) before starting a new closed caption data byte sequence.

Figure 10:
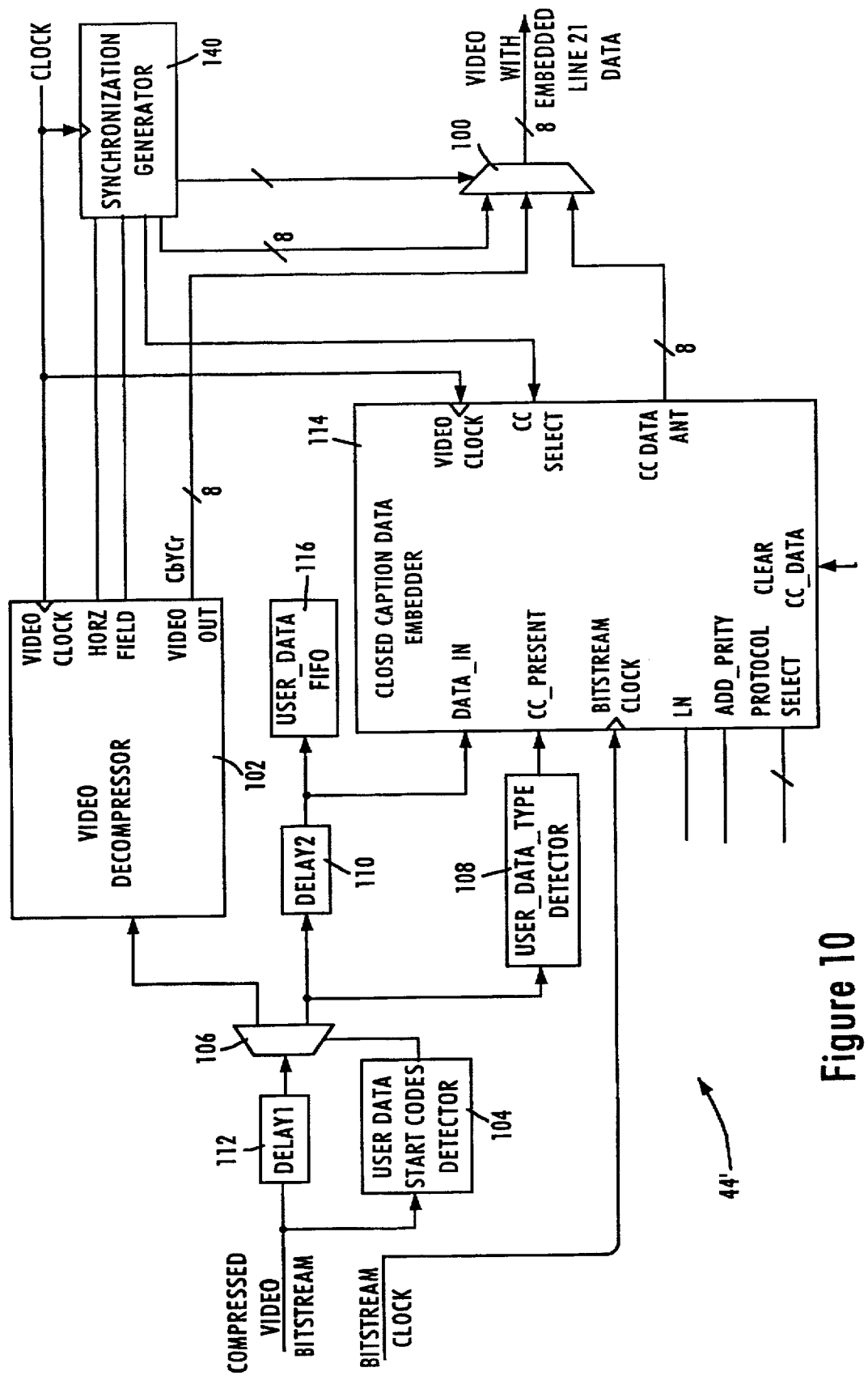
FIG. 10 is a block diagram of a video decoder with closed caption embedder constructed in accordance with an embodiment of the present invention and used in the arrangement of FIG. 3, when configured with an analog video encoder as depicted in FIGS. 5 and 7.

Another embodiment of a video decoder is depicted in FIG. 10, this embodiment being particularly suitable in arrangements in which the video decoder 44' does not receive external horizontal and field signals for display synchronization. Instead, the video decoder 44' generates all synchronization signals. The video decoder of FIG. 10 is used, for instance, with the analog video encoder 46 of FIG. 5, and in the CCIR-656 mode, for example. The video decoder of FIG. 10 is similar to that of FIG. 8, so that description of elements common to these two embodiments will not be repeated.

The video decoder 44 in the embodiment of FIG. 10 has a synchronization module 140 with a data encoding section that generates the SAV, EAV (start of active video, end of active video) and ancillary data. The synchronization module 140 controls multiplexer 100 to cause it to output one of:,digital video from the video decompressor 102, the closed caption data byte sequences from the closed caption data embedder 114, or the CCIR-656 synchronization codes (SAV, EAV . . . ) .

The multiplexer 100 in this embodiment has three inputs: digital video from the video decompressor 102; CCIR-656 SAV, EAV information from the synchronization module 140; and the closed caption data byte sequence from the closed caption data embedder 114. The synchronization module 140 informs the multiplexer 100 when to output the proper bytes.

In the embodiment of FIG. 10, the closed caption data embedder 114 receives a signal 'CC_select' from the synchronization module 140 that informs the embedder 114 when to issue the closed caption byte sequence. Since it does not control multiplexer 100, the closed caption data embedder 114 in this embodiment does not generate the Embedded_CC_select output signal, in contrast to the embodiment of FIG. 8. Additionally, the byte sequence out of the closed caption data embedder 114 in the embodiment of FIG. 10 is 0, 254 instead of 0, 255. The values 0, 254 form the CCIR-656 start sequence for SAV and EAV from the synchronization module 140.

Figure 11:
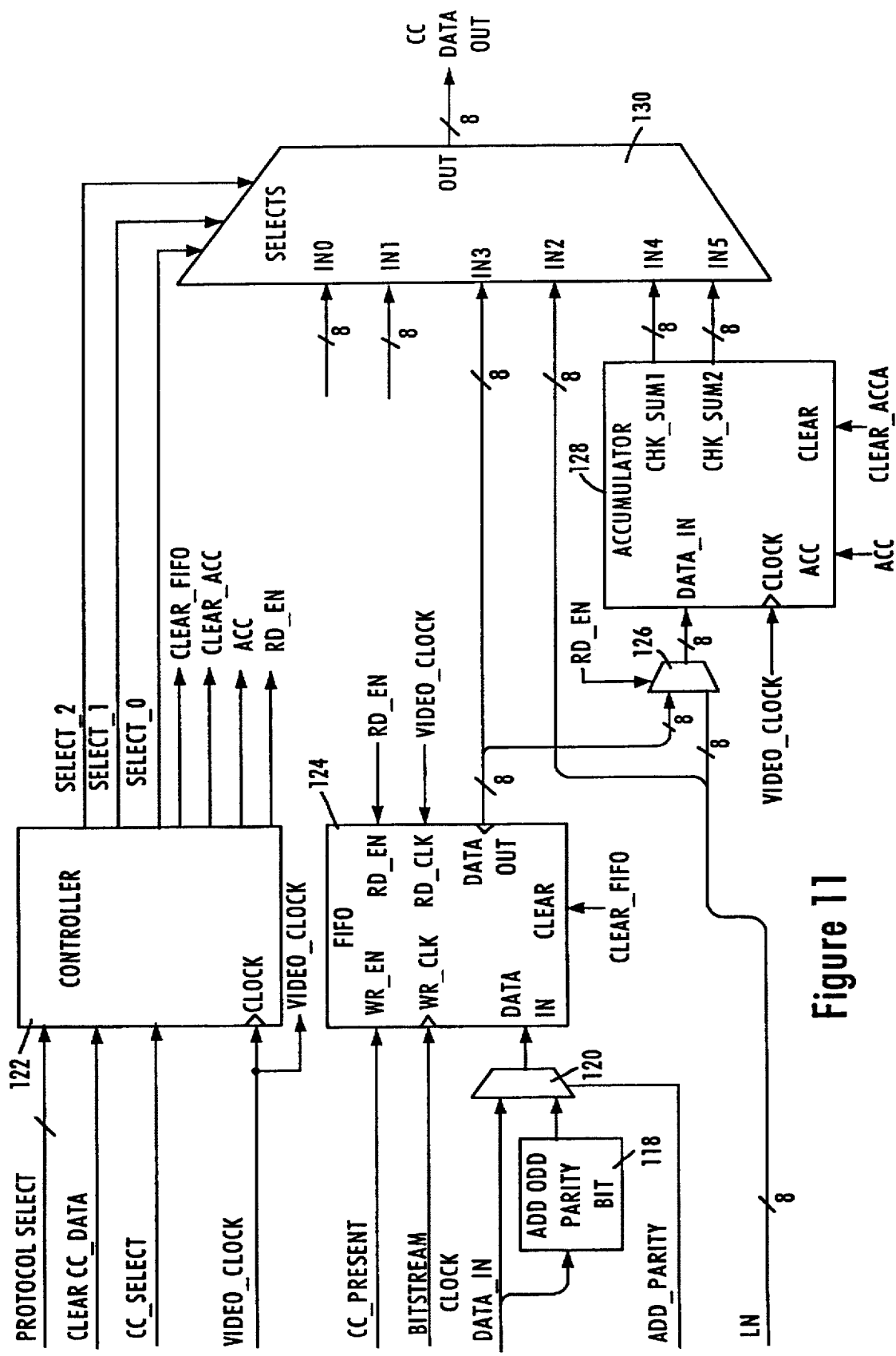
FIG. 11 is a block diagram of a closed caption data embedder constructed in accordance with an embodiment of the present invention and used in the video decoder of FIG. 10.

The embodiment of the closed caption data embedder 114 used in the embodiment of the video decoder of FIG. 10 is depicted in FIG. 11. Its operation is similar to the embodiment of the data embedder of FIG. 9, with the exceptions as noted above in the description of the video decoder 44 of FIG. 10.

Although the present invention has been described and illustrated in detail, it is clearly understood that the same is by way of illustration and example only and is not to be taken by way of limitation, the spirit and scope of the present invention being limited only by the terms of the appended claims.

I claim:

1. An arrangement for decoding an input transport signal, comprising:

a transport demultiplexer that receives an input transport stream and demultiplexes the input transport stream into an audio stream and a video stream containing compressed video and user data;

a video decoder that receives the video stream and generates decompressed video and closed caption data therefrom; and an analog video encoder that receives the decompressed video and closed caption data and generates an analog video output signal with encoded closed caption data.

2. The arrangement of claim 1, wherein the analog video encoder has a single interface for receiving the decompressed video and closed caption data.

3. The arrangement of claim 2, wherein the closed caption data is encoded as ancillary data.

4. The arrangement of claim 3, wherein the ancillary data includes code data which indicates that closed caption data follows the code data.

5. The arrangement of claim 4, wherein the closed caption data follows the code data by a predetermined amount of bytes.

6. The arrangement of claim 4, wherein the closed caption data follows the code data by an amount of bytes indicated by information in the code data.

7. The arrangement of claim 4, wherein the analog video encoder includes a data decoder that examines the code data and prepares the analog video encoder to receive the closed caption data that follows the code data.

8. The arrangement of claim 7, wherein the analog video encoder includes a closed captioning encoder and a multiplexer controlled by the data decoder to provide the closed caption data to the closed captioning encoder.

9. The arrangement of claim 8, wherein the analog video encoder includes a chroma encoder that receives Cr and Cb data from the multiplexer and scales the Cr and Cb data for chroma encoding.

10. The arrangement of claim 9, wherein the analog video encoder includes a luma processor that receives luma data from the multiplexer and interpolates the luma data.

11. The arrangement of claim 3, wherein the decompressed video and closed caption data conforms to CCIR-656 standard.

12. The arrangement of claim 2, wherein the analog video encoder includes a synchronization signal generator that generates at least one synchronization signal received by the video decoder, the video decoder sending the closed caption data to the analog video encoder in response to the at least one synchronization signal.

13. The arrangement of claim 12, wherein the closed caption data is sent to the analog video encoder by the video decoder during a vertical synchronization period.

14. The arrangement of claim 12, wherein the closed caption data is sent to the analog video encoder by the video decoder following a specific preamble of data bytes during a blanking interval.

15. The arrangement of claim 12, wherein the analog video encoder includes a data decoder that examines data bytes to determine whether closed caption data is present.

16. The arrangement of claim 15, wherein the analog video encoder includes a closed captioning encoder and a multiplexer controlled by the synchronization signal generator to provide to the closed captioning encoder the closed caption data determined by the data decoder to be present.

17. The arrangement of claim 16, wherein the analog video encoder includes a chroma encoder that receives Cr and Cb data from the multiplexer and scales the Cr and Cb data for chroma encoding.

18. The arrangement of claim 17, wherein the analog video encoder includes a luma processor that receives luma data from the multiplexer and interpolates the luma data.

19. The arrangement of claim 18, wherein the decompressed video and closed caption data conforms to CCIR-601 standard.

20. An analog video encoder for converting a digital video stream to analog video signals, comprising:
 a single interface for receiving a digital video stream that includes video data and closed caption data;
 at least one video data processor for converting the video data into analog video signals;
 a data decoder for identifying closed caption data in the digital video stream; and
 a closed captioning encoder for receiving closed caption data and inserting the closed caption data into the analog video signals.

21. The analog video encoder of claim 20, wherein the single interface includes a multiplexer that has an input for receiving the digital video stream, a plurality of selectable outputs, and a select input at which a select signal is received to select the output of the multiplexer.

22. The analog video encoder of claim 21, wherein the at least one video processor includes a chroma encoder that receives Cr and Cb data in the video data from a first one of the outputs of the multiplexer, scales the Cr and Cb data for chroma encoding, and generates color burst information.

23. The analog video encoder of claim 22, further comprising another video processor that is a luma processor that receives luma data from a second one of the outputs of the multiplexer and interpolates the luma data.

24. The arrangement of claim 23, further comprising a digital to analog converter coupled to receive the outputs of the -chroma encoder, the luma processor and the closed captioning encoder and converting the outputs to analog signals.

25. The analog video encoder of claim 20, wherein the closed caption data received at the single interface is encoded as ancillary data.

26. The analog video encoder of claim 25, wherein the ancillary data includes code data which indicates that closed caption data follows the code data.

27. The analog video encoder of claim 26, wherein the closed caption data follows the code data by a predetermined amount of bytes.

28. The analog video encoder of claim 26, wherein the closed caption data follows the code data by an amount of bytes indicated by information in the code data.

29. The analog video encoder of claim 20, wherein the analog video encoder includes a synchronization signal generator that generates at least one synchronization signal to time sending of the closed caption data to the analog video encoder in the digital video stream.

30. The analog video encoder of claim 29, wherein the synchronization signal is timed to cause receipt of the closed caption data by the analog video encoder during a vertical synchronization period.

31. The analog video encoder of claim 29, wherein the synchronization signal is timed to cause receipt of the closed caption data by the analog video encoder following a specific preamble of data bytes during a blanking interval.

32. A method of inserting closed caption data in a video signal, comprising:
 receiving an input transport stream,
 demultiplexing the input transport stream into an audio stream and a video stream containing compressed digital video data and user data;
 decompressing the compressed video data into digital video data;
 receiving the digital video data and closed caption data at a single data interface of an analog video encoder; and
 converting the digital video data and closed caption data into video analog signals with inserted closed captioning using the analog video encoder.

33. The method of claim 32, wherein the step of receiving includes receiving the closed caption data encoded within ancillary data.

34. The method of claim 33, wherein the ancillary data includes code data which indicates that closed caption data follows the code data.

35. The method of claim 34, wherein the closed caption data follows the code data by a predetermined amount of bytes.

36. The method of claim 35, wherein the closed caption data follows the code data by an amount of bytes indicated by information in the code data.

37. The method of claim 32, further comprising generating at least one synchronization signal to time sending of the closed caption data to the analog video encoder in the digital video data.

38. The method of claim 37, wherein the synchronization signal is timed to cause receipt of the closed caption data by the analog video encoder during a vertical synchronization period.

39. The method of claim 37, wherein the synchronization signal is timed to cause receipt of the closed caption data by the analog video encoder following a specific preamble of data bytes during a blanking interval.

* * * * *